United States Patent [19]

Ayukawa et al.

[11] Patent Number: 5,060,292
[45] Date of Patent: Oct. 22, 1991

[54] TRANSMITTING POWER CONTROL SYSTEM

[75] Inventors: Ichiro Ayukawa, Yokohama; Sachio Miyazaki, Tokyo, both of Japan

[73] Assignee: Fujitsu Limited, Kawasaki, Japan

[21] Appl. No.: 490,249

[22] Filed: Mar. 8, 1990

[30] Foreign Application Priority Data

Mar. 9, 1989 [JP] Japan .................................. 1-056760

[51] Int. Cl.$^5$ .......................................... H04B 7/185
[52] U.S. Cl. ...................................... 455/52; 455/115; 455/127; 455/10
[58] Field of Search ...................... 455/10, 12, 40, 52, 455/69, 115, 127; 370/104

[56] References Cited

U.S. PATENT DOCUMENTS

| | | | |
|---|---|---|---|
| 4,731,866 | 3/1988 | Muratani et al. | 455/52 |
| 4,896,369 | 1/1990 | Adams, Jr. et al. | 455/52 |
| 4,910,792 | 3/1990 | Takahata et al. | 455/10 |
| 4,941,199 | 7/1990 | Saam | 455/52 |

*Primary Examiner*—Curtis Kuntz
*Attorney, Agent, or Firm*—Armstrong, Nikaido, Marmelstein, Kubovcik & Murray

[57] ABSTRACT

A transmitting power control system includes a first-mode arithmetic operation unit for arithmetically obtaining an actual up-link rain attenuation amount based on a total rain degradation amount and a down-link rain attenuation amount and arithmetically obtaining a ratio of the actual up-link rain attenuation amount to the down-link rain attenuation amount. A measurement executable judgement unit determines whether or not the measurement is possible based on the originating station returning wave. A second-mode arithmetic operation unit is connected to the first mode arithmetic operation unit for presuming and arithmetically obtaining an up-link rain attenuation amount based on the actual rain attenuation amount ratio and the down-link rain attenuation amount by latching the rain attenuation amount ratio when the measurement executable judgement unit determines that the measurement is impossible.

11 Claims, 11 Drawing Sheets

TRANSMITTING POWER CONTROL SYSTEM

BACKGROUND OF THE INVENTION

The present invention relates to a transmitting power control system and more particularly to a transmitting power control system used for providing a constant power to a satellite during satellite communication.

Rain, occurring on a transmission path between a communication satellite and a ground station, may cause attenuation of transmitted power, thus stopping satellite operation. To avoid such a situation, it is necessary to provide a transmitting power control system which ensures that transmission power is constantly applied to the satellite.

Figure 1:
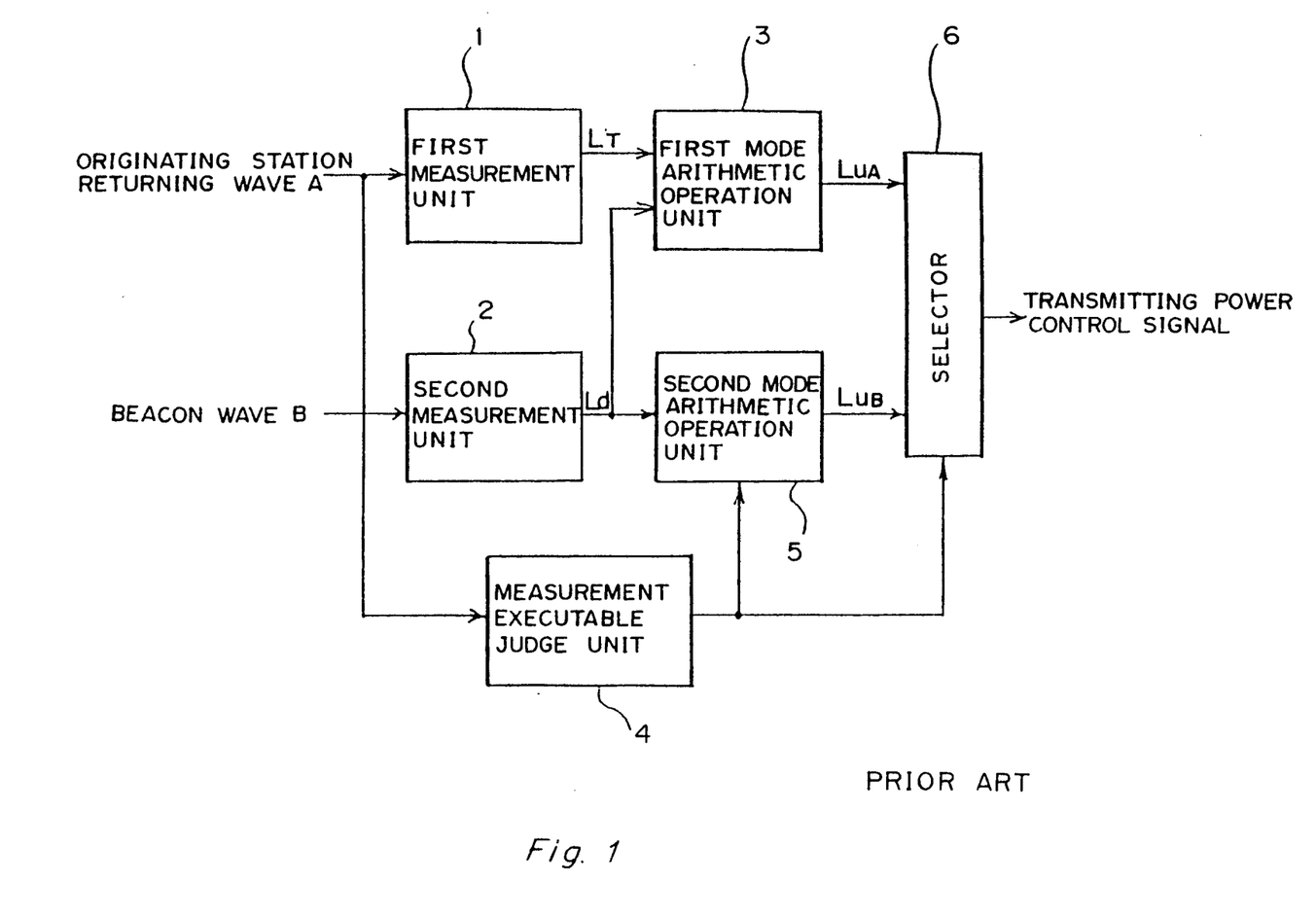
FIG. 1 shows a block diagram of an example of a conventional transmitting power control system.
Figure 2A:
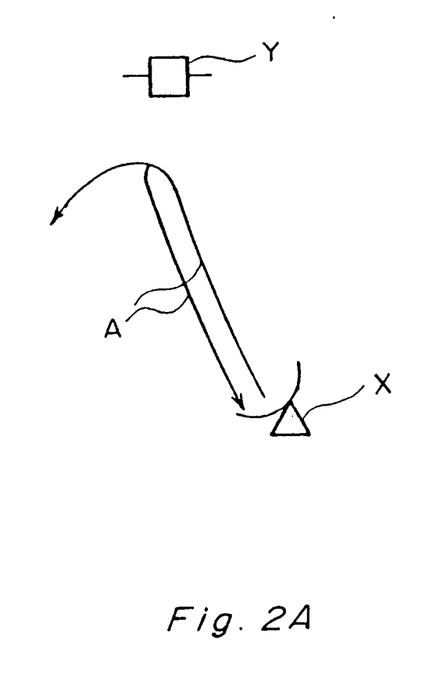
FIGS. 2A and 2B show a pictorial diagram for explaining a mode for obtaining an up link rain attenuation amount.
Figure 2B:
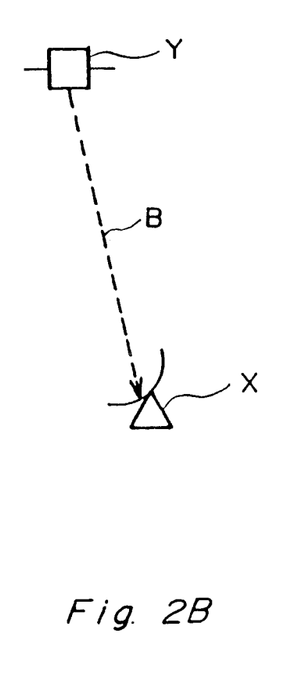

FIG. 1 shows a conventional transmitting power control system comprising a first measurement unit 1, a second measurement unit 2, a first mode operation unit 3, a measurement executable judging unit 4, a second mode operation unit 5, and a switching selector 6. As shown in FIG. 2A, first measurement unit 4 measures degradation amount of a returning signal quality $L_T$ using an originating station returning wave A which runs over a communication path from a ground station X to a communication satellite Y, namely, an up link in which a signal transmission is upward, and a communication path from a communication satellite Y to a ground station X, namely, a down link in which a signal transmission is downward. As shown in FIG. 2B, second measurement unit 2 measures a rain attenuation amount $L_B$ of a down link from a communication satellite Y to a ground station X by using a beacon wave B. First mode arithmetic operation unit 3 arithmetically obtains an actual up-link rain attenuation amount Lu based on a degradation amount of a returning signal quality $L_T$ and a down link rain attenuation amount Ld. Measurement executable judging unit 4 determines whether the measurement is possible or not, based on an originating station returning wave. Second mode arithmetic operation 5 arithmetically assumes and obtains an up-link rain attenuation amount $Lu_A$ based on a down link rain attenuation amount Ld when measurement executable determining judging unit 4 determines that the measurement is impossible. Switching unit (selector) 6 produces a transmitting power control signal by switching the output from the first mode operation unit 3 to the output of the second mode operation unit 5 when the measurement executable judging unit 4 determines that the measurement is impossible.

In such a conventional system, a total degradation amount of a returning signal quality $L_T$ for an up-link and a down-link is measured by providing an originating station returning wave A to first measurement unit 1 and a rain wave attenuation amount Ld for a down link is measured by providing a beacon wave B to second measurement unit 2.

A degradation amount of a returning signal quality $L_T$ measured by first measurement unit 1 and a rain attenuation amount Ld for the down link measured by second measurement unit 2 is provided to first mode arithmetic operating unit 3 to perform an arithmetic operation on a rain attenuation amount $Lu_A$ for an up link.

In this case, an up-link rain attenuation amount $Lu_A$ can be obtained as an actual value in accordance with the following theoretical equation designating that the up-link rain attenuation amount $Lu_A$ is a function of $L_T$ and Ld.

$$Lu_A = f(L_t, Ld) \ldots \quad (1)$$

A rain attenuation amount Ld for a down link measured by the second measurement unit 2 is provided to the second mode, arithmetic operation unit 5 to arithmetically obtain a rain attenuation amount $Lu_B$. In this case, a rain attenuation amount $Lu_B$ for an up link is presumed according to the following equation.

$$Lu_B (dB) = K \times Ld (dB) \ldots \quad (2)$$

where, K is a constant.

Figure 3:
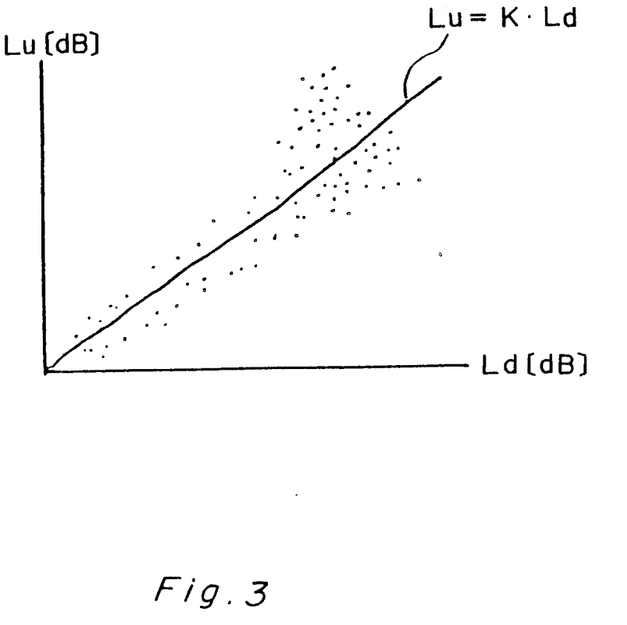
FIG. 3 shows a diagram designating a relation between a down-link rain attenuation amount Ld and an up-link rain attenuation amount Lu.

In this case, a relation between a rain attenuation amounts Lu and Ld is actually distributed as shown in the experimentation graph shown in FIG. 3. The accuracy of equation (1) is better than that of equation (2).

On the other hand, rain attenuation amount $Lu_A$ for the up-link obtained in accordance with FIG. 2A is more limited in respect of measurable scope than rain attenuation amount $Lu_B$ for the up-link presumed in accordance with FIG. 2B. Actually, if a bit error rate is used to detect degradation amount of the originating station returning wave quality, the scope in which an appropriate bit error is generated within an actual measurable period is limited.

Accordingly, measurement executable judgement unit 4 determines whether or not the originating station returning wave A can be used for the measurement. If it determines the measurement is impossible, the up-link rain attenuation amount $Lu_B$ obtained from the second mode arithmetic operation unit 5 is outputted from selector 6. If it determines that the measurement is possible, the up-link rain attenuation amount $Lu_A$ obtained by the first mode arithmetic operating unit 3 is outputted from selector 6.

Figure 4:
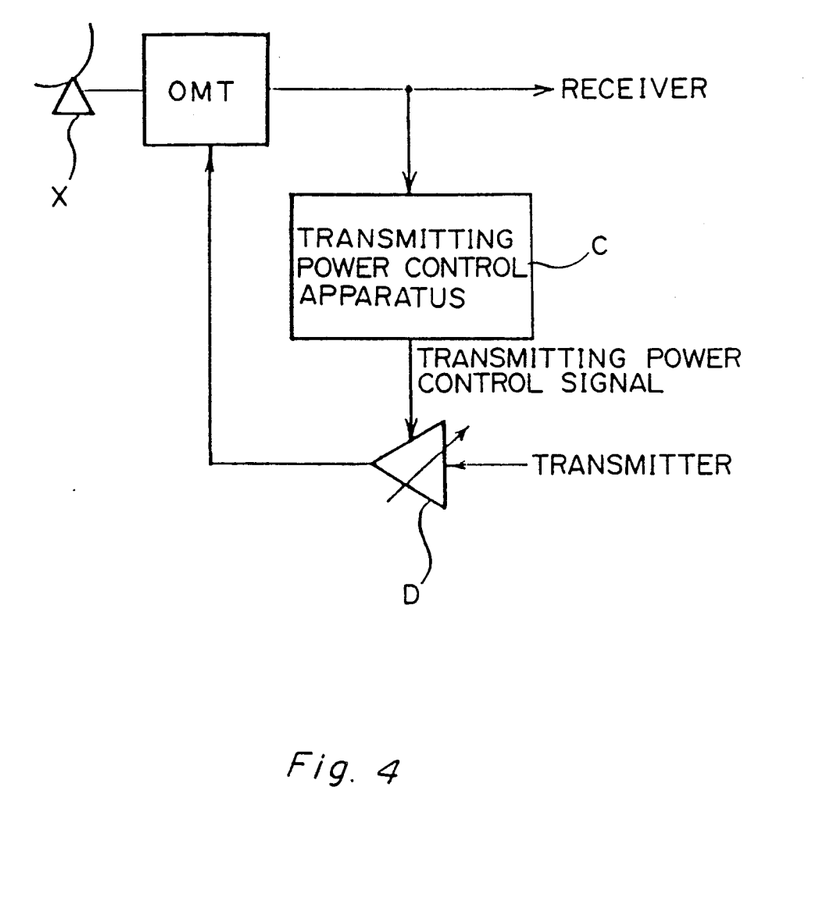
FIG. 4 shows a block diagram of a transmitting power control system.

The output from selector 6 is provided to an amplifier D for performing a power amplification of a transmitting signal from a transmitter (not shown). The transmitting power control signal from the transmitting power control apparatus C, shown in FIG. 4, is further transmitted from the antenna X through an orthogonal mode transducer.

However, in such a conventional transmitting power control system, two mode operation units for obtaining an up-link rain attenuation amount performs operations independently from each other. The outputs of these two mode operating units are selected by selector 6 depending on whether or not the originating unit returning wave can be used for the measurement. Therefore, there is a problem that the transmitting control power becomes discontinuous upon switching the power of selector 6.

SUMMARY OF THE INVENTION

An object of the present invention is to avoid a discontinuous transmitting control power even for an up-link rain attenuation amount obtained through respective arithmetic operations by using two modes of the arithmetic operation, thereby making transmitting power to a communication satellite constant.

A feature of the present invention resides in a transmitting power control system, a first measuring unit for measuring degradation amount of a returning signal quality of the up link and down link by using the originating station returning wave, a second measurement unit for measuring the down link rain attenuation amount by using a beacon wave, a first mode arithmetic operation unit for always arithmetically obtaining on an actual up-link rain attenuation amount based on the returning degradation attenuation amount and the down link rain attenuation amount and arithmetically obtaining a ratio of said actual up-link rain attenuation amount to said down link rain attenuation amount, a measurement executable judgement unit for determining whether or not the measurement is possible based on the originating station returning wave, a second mode arithmetic operating unit for presuming and arithmetically obtaining the up-link rain attenuation amount based on the rain attenuation amount ratio and the down-link rain attenuation amount by latching the rain attenuation amount ratio when said measurement executable judgement unit determines that the measurement is impossible, and a selecting unit for selectively providing output of said first mode arithmetic operating unit when said measurement executable judgement unit determines based on the originating station returning wave that measurement is impossible and selectively providing the output of the second mode arithmetic unit when said measurement executable judgement unit determines that measurement is impossible.

EMBODIMENT OF THE PRESENT INVENTION

Figure 5:
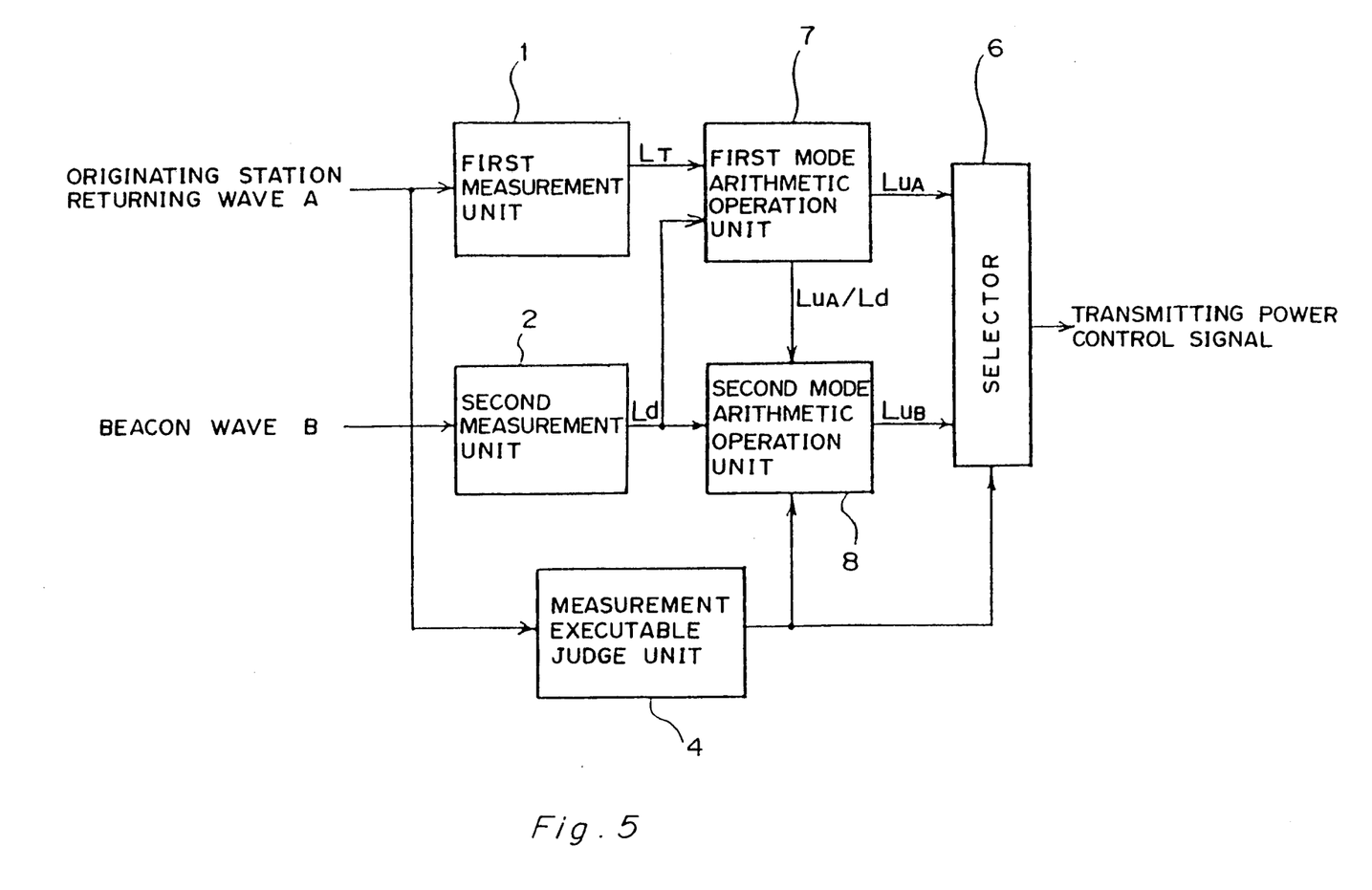
FIG. 5 shows a principle block diagram of the present invention, FIG. 6 designates a block diagram of an entire structure of an embodiment of the present invention.

In FIG. 5, which shows a principle block diagram of the present invention, measurement units 1 and 2, measurement executable judging unit 4 and selector 6 are the same as in the prior art shown in FIG. 1. However, first mode arithmetic operating unit 7 and second mode arithmetic operating unit 8 are different.

In the present invention, an up-link rain attenuation amount $Lu_A$ is theoretically obtained in accordance with equation (1) in first mode arithmetic operating unit 7, based on degradation amount of the returning wave quality $L_T$ obtained from first measurement unit 1 and a down link rain attenuation amount Ld obtained from the second measurement unit 2. The ratio $Lu_A/Ld$ of the up-link rain attenuation amount $Lu_A$ to the down-link rain attenuation amount Ld from the second measurement unit 2 is then arithmetically obtained and provided to second mode arithmetic operating unit 8.

Measurement executable judging unit 4 determines, based on the originating station returning wave, whether or not the measurement is possible, namely, whether or not the first mode operating unit 7 can perform a normal arithmetic operation. When unit 4 determines that the measurement is impossible, second mode arithmetic operating unit 8 latches the most recent ratio $Lu_A/Ld$, provided by the first mode arithmetic operating unit 7, based on the signals from measurement executable judging unit 4 to determine a constant K in the above recited equation (2) and multiplies K by the down link rain attenuation amount Ld which changes with time, thereby performing a presumed arithmetic operation of the up-link rain attenuation amount $Lu_B$ after the measurement is determined as being impossible to measure.

When measurement executable judging unit 4 determines that the measurement is possible, selector 6 selects the output of the first mode arithmetic operating unit. When the measurement is determined to be impossible, it switches from the output of first mode arithmetic operating unit 7 to the output of second mode arithmetic operating unit 8, thereby enabling a transmitting control power signal to be generated.

As explained above, according to the present invention, the output of the second mode arithmetic operating unit 8 complies with $Lu_A$ upon a switching of the mode. Therefore, an assumed arithmetic operation of the up-link rain attenuation amount can be carried out while maintaining measurement continuity after the switching mode is changed from the output of first mode arithmetic operating unit 7 to the second mode arithmetic operating unit 8.

Figure 6:
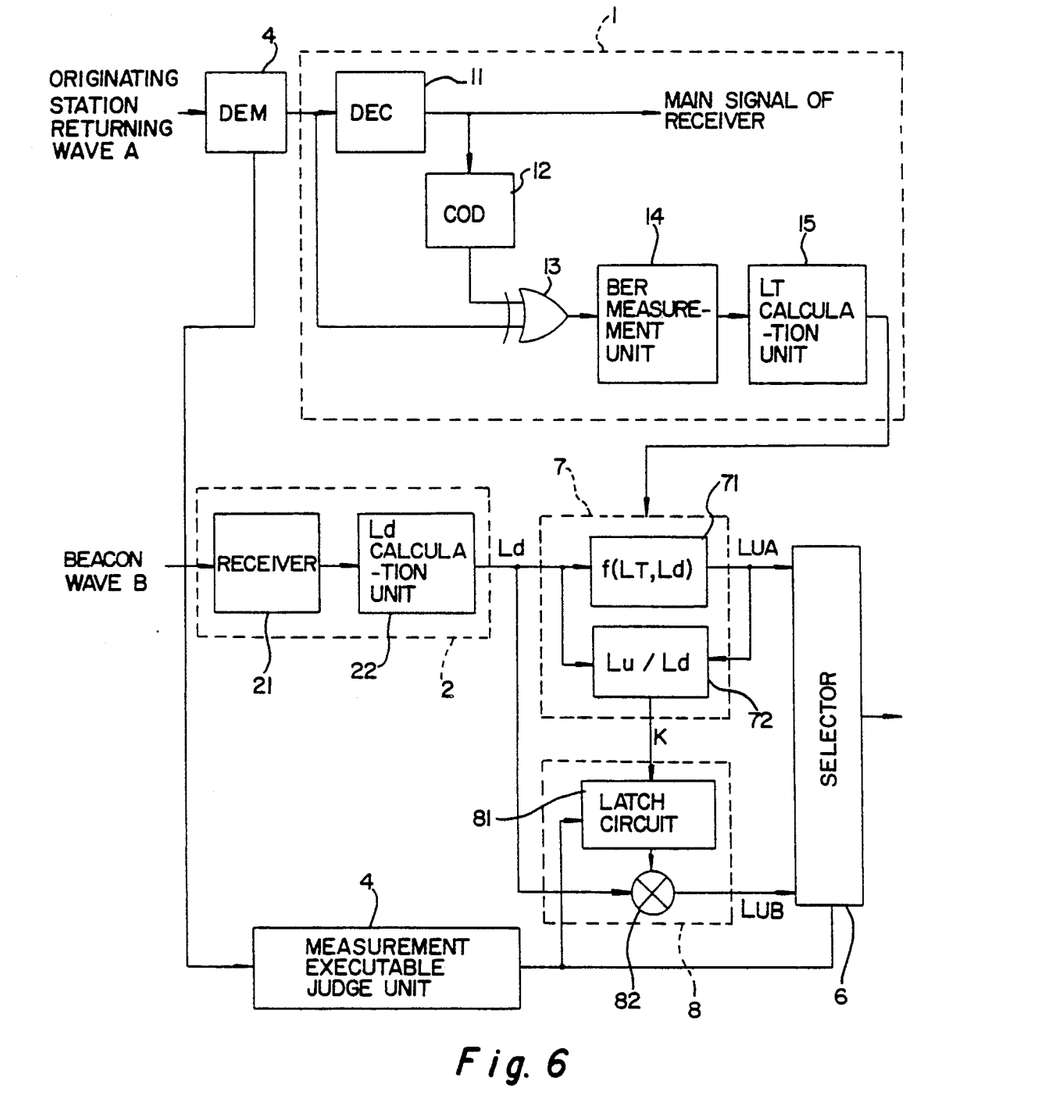

FIG. 6 shows the entire structure of an embodiment of the transmitting power control system according to the present invention uses the demodulation DEM and the measurement executable judging unit 4 produces a signal designating the measurement (receipt) of the possible/impossible designating signal based on whether or not the AFC of the demodulator can be accurately followed. First measurement unit 1 comprises a decoder (DEC) 11 for performing an error and decoding a digital demodulation signal containing a bit error in the originating station returning wave A transmitted from demodulator 4 and providing it as a main signal to a receiver (not shown), an encoder (COD) 12 for coding the main signal, an EXOR gate 13 for detecting a coincidence between a signal coded by coder 12 and the output of demodulator 4 before decoding to obtain an error bit, a BER measurement unit 14 for measuring bit error rate (BER) by using an error bit obtained from gate 13, and $L_T$ calculating unit 15 for calculating a returning total rain degradation amount $L_T$ of the originating station returning wave from a bit error rate and C/N (the predetermined ratio of the carrier wave/noise) in clear weather to provide the total rain degradation amount $L_T$ to the first mode operating unit 7. Second measurement unit 2 comprises a receiver 21 for receiving a beacon wave B, and an Ld calculating unit 22 for calculating a down-link rain attenuation amount Ld by comparing the C/N of a beacon wave received from receiver 21 with a predetermined C/N for clear weather. These first and second measurement units are the same as those in the prior art.

Further, the first mode arithmetic operating unit 7 comprises a first mode up-link rain attenuation amount arithmetic operating unit 71 for calculating a rain attenuation amount $Lu_A$ for an up-link from the above equation (1) based on a returning rain degradation amount $L_T$ calculated from first measurement unit 1 and a rain attenuation amount Ld for a down-link calculated by second measurement unit 2, and up-link/down-link attentuation amount ratio arithmetic operating unit 72 for arithmetically obtaining the ratio $Lu_A/Ld$, namely, the ratio of the calculated up-link rain attenuation amount $Lu_A$ to down-link rain attenuation amount Ld. Second mode arithmetic operating unit 8 comprises latch circuit 81 for latching the ratio $Lu_A/Ld$ obtained from arithmetic operating unit 72 by using the measurement executable judging signal obtained from measurement executable judging unit 4 and multiplier 82 for multiplying the output of latch circuit 81 with the down link rain attenuation amount Ld.

Next, an operation of the circuit shown in FIG. 6 is explained. First mode up-link rain attenuation amount arithmetic operating unit 71 in first mode arithmetically operating unit 7 receives the returning rain degradation amount $L_T$ calculated by the first measurement unit 1 and the down link rain attenuation amount Ld calculated by the second measurement unit 2. It then transmits the originating unit returning wave up-link rain attenuation amount $Lu_A$ to selector 6 as in the prior art and up-link/down link attenuation amount ratio calculating unit 72 continuously arithmetically obtains ratios $Lu_A/Ld$ and transmits them to latch circuit 81.

Measurement executable judging unit 4 determines, because of the narrow measurement scope of the originating station returning wave, that the measurement is impossible. Latch circuit 81 then latches the most recent ratio $K = Lu_A/Ld$ obtained by arithmetic operating unit 72 and provides it to multiplier 82. Multiplier 82 multiplies the down-link rain attenuation amount Ld by the ratio K, thus obtaining the up-link rain attenuation amount $Lu_B$ from the down link, and thereby providing it to selector 6.

Then, selector 6 selects the output signal from multiplier 82 as the control signal from measurement executable judging unit 4 designates that the measurement is impossible.

Accordingly, if the ratio $K = Lu_A/Ld$ is provided to multiplier 82 upon a switching, the multiplier output $K \times Ld = Lu_A/Ld \times Ld = Lu_A$. Thus, the multiplier output Ld is equal to the up link rain attenuation amount $Lu_A$ from the first mode arithmetic operation unit 7. Thus, a smooth switching operation is performed.

In second mode arithmetic operating unit 8, latch circuit 81 receives a fixed ratio $K = Lu_A/Ld$ upon switching. In addition, multiplier 82 receives the fixed ratio $K = Lu_A/Ld$ and arithmetically obtains the up-link rain attenuation amount $Lu_B$ from the down-link attenuation amount Ld of the beacon wave B and outputs it from selector 6. Upon a switching, Ld of the ratio K is equal to the down link rain attentuation Ld obtained from second measurement unit 2. Thereafter, the rain attenuation amount Ld for the down link output from second measurement unit 2 varies and thus the up-link rain attenuation amount $K \times Ld$ is output.

When measurement of the originating station returning wave A becomes possible, selector 6 again outputs the up link rain attenuation amount $Lu_A$ of the output of the first mode arithmetic operation unit 7 as a transmission power control signal and the above operation is repeated.

Figure 7:
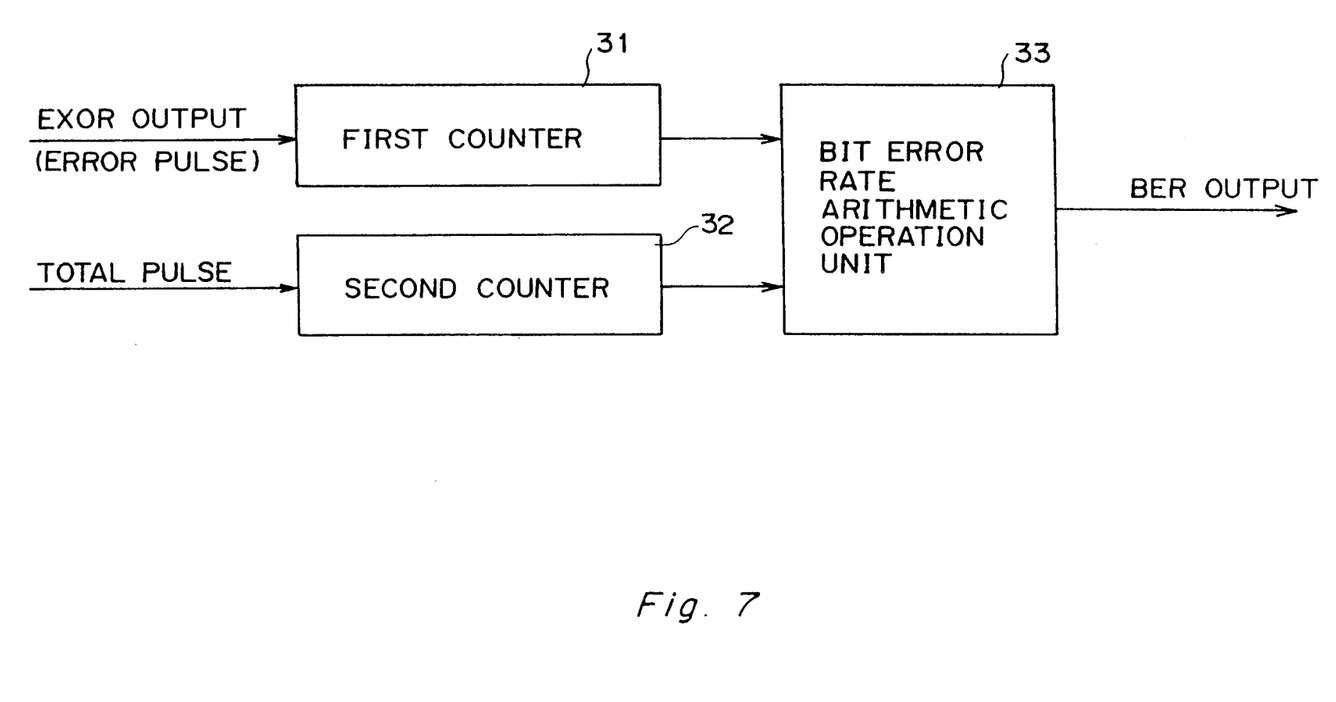
FIG. 7 shows a block diagram of a BER measuring unit in the embodiment shown in FIG. 6.

FIG. 7 shows a block diagram of a basic structure of BER measuring unit 14 of the embodiment. BER measuring unit 14 comprises a first counter 31 for counting an error pulse output from EXOR gate 13 in FIG. 6, a second counter 32 for counting the total number of pulses during the period in which the bit error rate is measured, and a bit error rate arithmetic operating unit 33 for obtaining a bit error ratio based on the output of the two counters.

Figure 8:
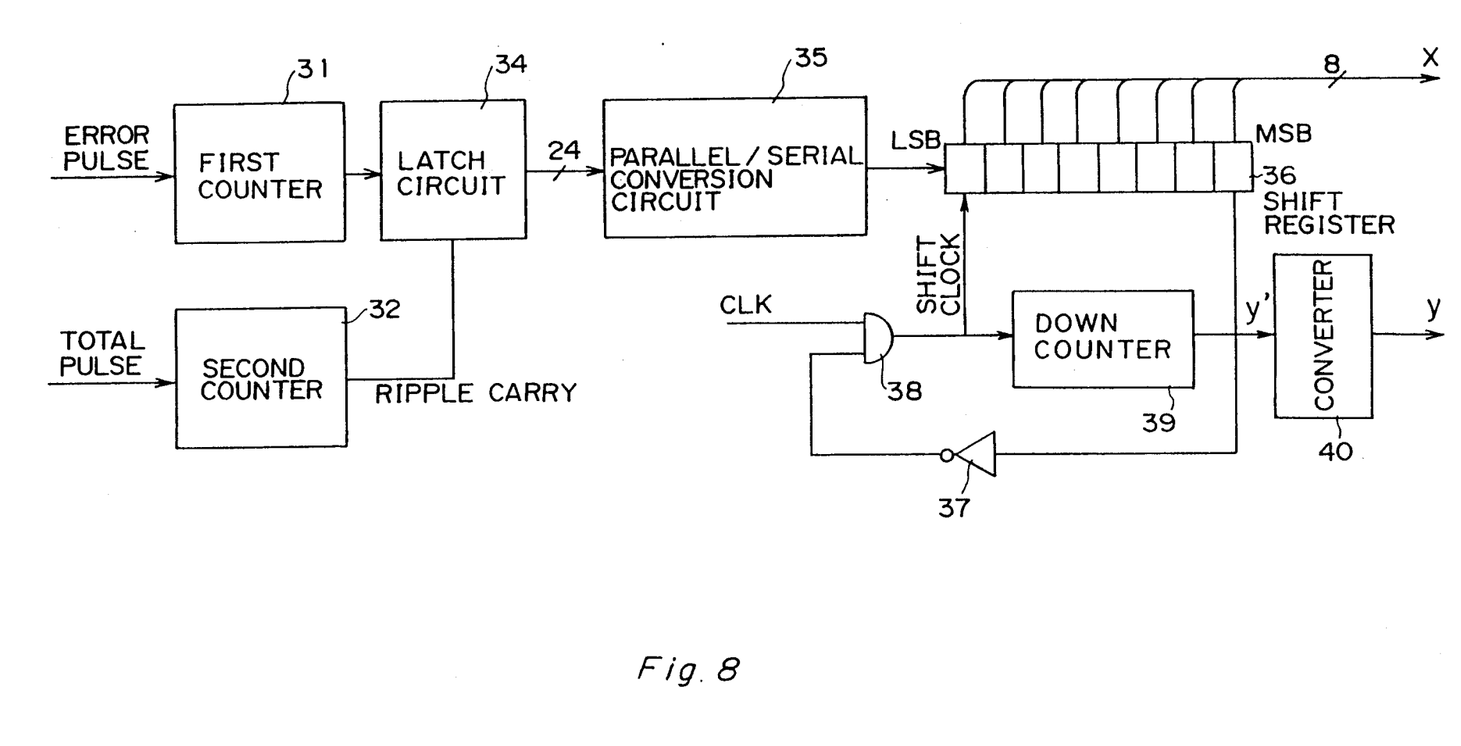
FIG. 8 shows a block diagram of a detailed structure of the bit error rate (BER) measurement un-it in the embodiment shown in FIG. 6.

FIG. 8 shows a detailed block diagram of BER measurement unit 14. The bit error rate (BER) is expressed in the exponent representation $X \times 2^Y/2^{28}$ to measure the ratio in a stretch from $10^{-2}$ to $10^{-6}$. However, a converter 40 is actually provided at the output side. This simplifies the hardware by decreasing the total number of pulses to be counted by the second pulse counter shown in FIG. 7 to less than $2^{28}$.

The number of error pulses to be counted by first counter 31 is latched at latch circuit 34 at a ripple carry output from second counter 32. The output of latch circuit 34 is converted to a serial signal by parallel/serial converting circuit 35 and the output is input to shift register 36 in a shifting manner from LSB to MSB. The shifting operation is controlled by a clock signal (CLK). A reverse signal obtained by reversing an output from the MSB of shift register 36 by inverter 7 is input to AND circuit 38 together with a clock signal. The shifting operation is continued until the content of MSB of shift register 36 becomes "1". Upon a shifting, the content of down counter 39 is subjected to a down counting by the number of clocks and the value of the converter 40 is added to the output y' of down counter 39 to be output as a value of y and the content of shift register is output as x when the content of MSB from shift register 36 becomes "1". When the content of the MSB of shift register 36 becomes "1", the head of the data is detected and the output of the down counter 39 decreases up to this time. Where the second counter 32 is an 18 bit counter, the relationship between the output y and the input y' of converter 40 satisfies the equation $y = y' + 10$.

Figure 9:
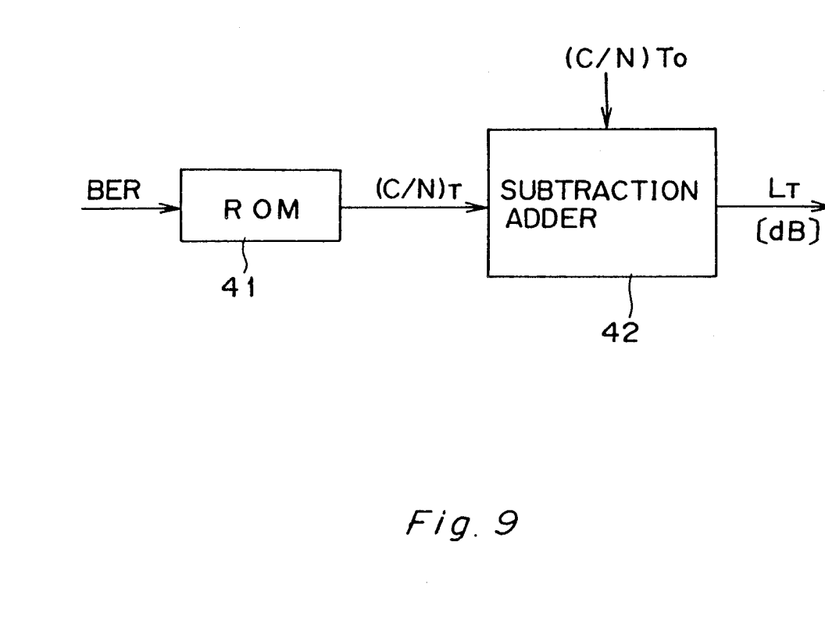
FIG. 9 shows a block diagram of the returning total rain attenuation amount calculating unit of the embodiment shown in FIG. 6.

FIG. 9 is a structural block diagram of the returning total rain degradation amount $(L_T)$ calculating unit 15 shown in FIG. 6. $L_T$ calculating unit 15 calculates a returning total rain degradation amount $L_T$ by using a bit error rate output from the BER measurement unit 14 and carrier wave/noise ratio (C/N) for clear weather. The bit error rate (BER) has a one-to-one relationship with the corresponding current carrier wave/noise ration (C/N)T. This relationship is stored in read only memory 41 in FIG. 9. Thus, the output of BER measurement unit 14 is input to read only memory 41, thereby providing the current total carrier wave/noise ratio (C/N)T.

The returning total rain degradation amount $L_T$ of the originating station returning wave is given by the following equation.

$$L_T = (C/N)_{T_o}/(C/N)_T \ldots \quad (3)$$

where, $(C/N)_{T_o}$ represents the total carrier wave/noise ratio for clear weather and this is known. When the units of equation (3) is expressed in "dB" the total rain degradation amount $L_T$ is obtained by subtracting the current carrier wave/noise ratio from the carrier wave/noise ratio for clear weather, by using subtraction adder 42 shown in FIG. 9.

Figure 10:
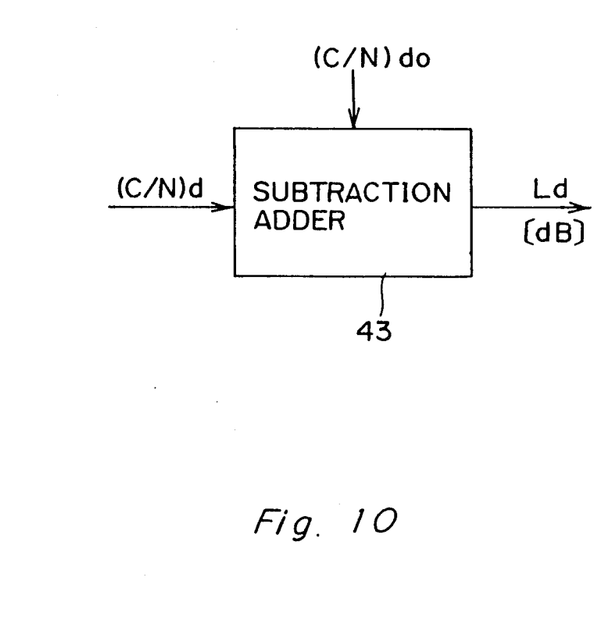
FIG. 10 shows a block diagram of a down-link rain attenuation amount arithmetic operating unit of the embodiment shown in FIG. 6.

FIG. 10 shows a block diagram of the down-link rain attenuation amount (Ld) calculation unit 22 of FIG. 6. Calculating unit 22 calculates Ld by comparing the current carrier wave/noise ratio (C/N)d of the down link of the beacon wave received from receiver 21 with the value of carrier wave/noise ratio (C/N) for clear weather and is previously known. The calculation can be obtained from the following equation using "dB" as a unit.

$$Ld[dB] = (C/N)do[dB] - (C/N)d[dB] \ldots \quad (4)$$

where, (C/N)do is a carrier wave/noise ratio of the down link wave for clear weather.

Subtractor adder 43 in FIG. 10 subtracts the current carrier wave/noise ratio (C/N)d from the carrier wave/noise ratio (C/N)do based upon clear weather in accordance with equation (4), thereby outputting the rain attenuation amount Ld of the down link wave.

Figure 11:
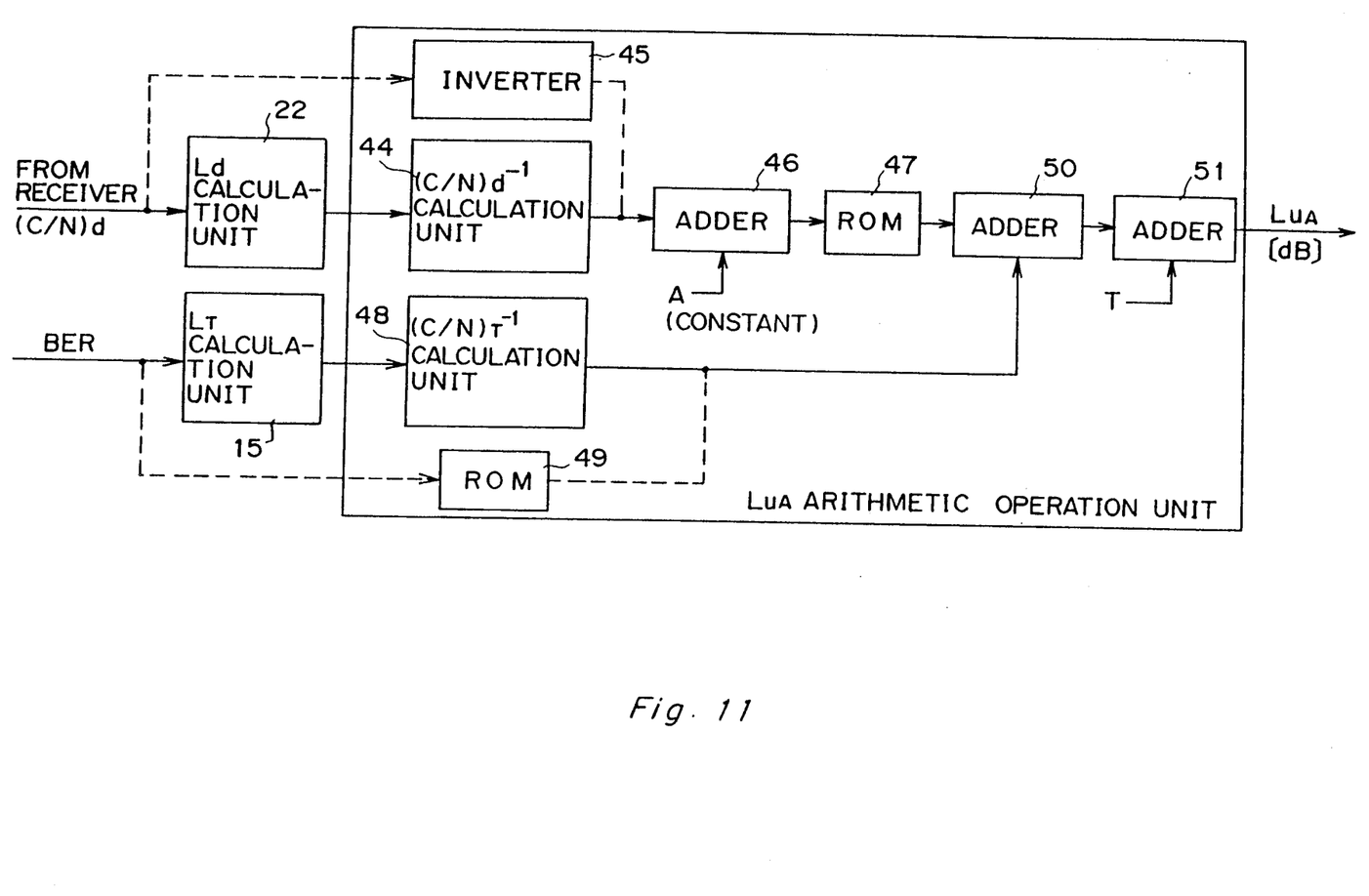
FIG. 11 shows a block diagram of the first mode of an up-link rain attenuation amount arithmetic operating unit of the embodiment shown in FIG. 6.

FIG. 11 shows a structural block diagram of the first mode up-link rain attenuation amount ($Lu_A$). First mode up-link rain attenuation amount arithmetic operation unit 71 arithmetically obtains the up-link rain degradation amount by using total returning rain attenuation amount $L_T$ of the originating station returning wave output from $L_T$ calculating unit 15. The down-link rain attenuation amount Ld of the beacon wave output from the down-link rain attenuation amount calculating unit 22 and equation (1) representing the above arithmetic operation can be provided according to the final form of the equation as follows.

$$Lu_A = T \times \frac{1}{(C/N)_{uo}^{-1} + A \times (C/N)_d^{-1}} \times (C/N)_T - 1 \quad (5)$$

where, T represents an increased amount of the current power as compared with the transmitting power upon measuring the C/N in clear weather, $(C/N)_{uo}^{-1}$ is the inverse C/N of the up link for clear weather and A is a ratio (constant) of an inverse of C/N of the down link for clear weather to the inverse of C/N of the beacon wave for the clear weather.

$(C/N)_d^{-1}$ calculating unit 44 in FIG. 11, arithmetically obtains the inverse of carrier wave/noise ratio of the current down link based on the value of Ld output from Ld calculating unit 22. The input to Ld calculating unit 22 is $(C/N)_d$ Therefore, the inverse can be obtained by inverter 45. The output of $(C/N)_d^{-1}$ calculating unit 44 is added to a constant A by adder 46, as shown in the second term of the denominator of the fraction in equation (5), and then the sum of the added value and the inverse of carrier wave/noise ratio of the up link for clear weather is obtained from read only memory 47.

The output from BER measurement unit 14 in FIG. 6 is provided to $L_T$ calculating unit 15 and the output thereof is applied to $Lu_A$ calculating unit 71. The output of $Lu_A$ calculating unit 71 is applied to $(C/N)_T^{-1}$ calculating unit 48 and as a result provides the inverse of $(C/N)_T$ to be input to subtractor adder 42 of $L_T$ calculating unit 15 shown in FIG. 9. Instead of read only memory 41 shown in FIG. 9, read only memory 49 may be employed to directly obtain the inverse value from the bit error rate (BER) output from BER measurement unit 14.

Adder 50 adds the inverse of the denominator of equation (5) output from read only memory 47, from $(C/N)d^{-1}$ calculation unit 44 or from read only memory 49. Furthermore, adder 51 adds the value of T shown in equation (5) to the output of adder 50, thereby outputting the first mode up link rain attenuation amount $Lu_A$.

Figure 12:
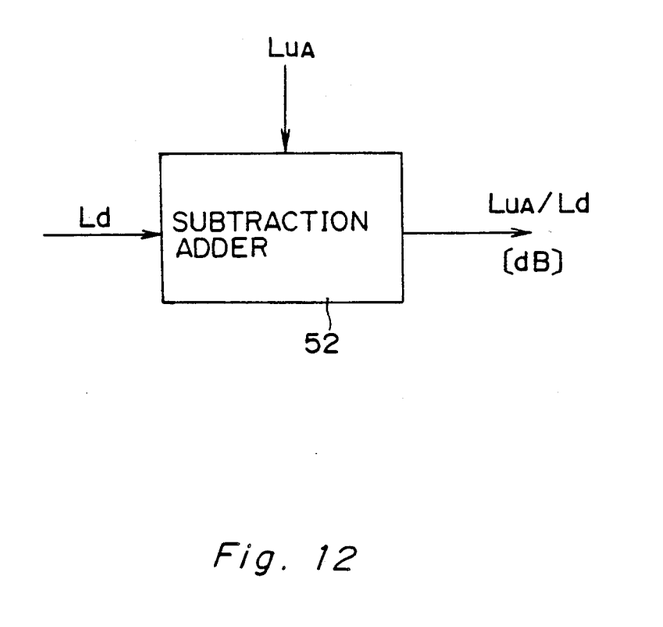
FIG. 12 shows a block diagram of an embodiment of an up-link/down-link attenuation amount ratio arithmetic operating unit of the embodiment shown in FIG. 11.

FIG. 12 is a block diagram of an up-link/down-link attenuation amount ratio ($Lu_A/Ld$) arithmetic operating unit. The arithmetic operating unit in FIG. 6 outputs a ratio of the first mode up link rain attenuation amount $Lu_A$ to down-link rain attenuation amount Ld and this ratio can be output as shown in FIG. 12 by obtaining the difference between $Lu_A$ and Ld using "dB" as the unit.

As explained above, according to the present transmitting power control system, the attenuation amount ratio of the actual up-link rain attenuation amount to the down-link rain degradation amount, which is obtained by the returning rain degradation amount and down-link rain degradation amount in the first mode arithmetic operation unit 7 is always and continuously subjected to the arithmetic operation. When the measurement executable judgement unit determines that the measurement is impossible, the up-link rain degradation amount is presumed and calculated from the rain degradation amount ratio and the down-link rain degradation amount by the second mode arithmetic operation unit when the rain degradation amount ratio is latched, thereby providing the output. Thus, in the present invention, when a mode is switched, the transmitting power control value is not discontinuous and the good accuracy of the up-link rain degradation amount obtained by the originating station returning wave reflects on the accuracy of the up-link rain degradation amount presumed by the beacon wave after the mode is switched. Therefore, the accuracy of the up-link rain attenuation amount obtained by the beacon wave can be improved. Thus, the present transmitting power control system can provide constant power to a satellite and is useful for a satellite communication system.

What is claimed is:

1. A transmitting power control system comprising:
   a first measuring means for measuring a total rain degradation amount of an up-link and a down-link using an originating station returning wave;
   a second measurement means for measuring a down-link rain attenuation amount using a beacon wave;
   a first-mode arithmetic operation means for arithmetically obtaining an actual up-link rain attenuation amount based on a total rain degradation amount and a down-link rain attenuation amount and for arithmetically obtaining a ratio of said actual up-link rain attenuation amount to said down-link rain attenuation amount;
   a measurement executable judgement means for determining whether or not measurement of total rain degradation amount is possible based on the originating station returning wave;
   a second-mode arithmetic operation means, connected to said measurement executable judgement means, for presuming and arithmetically obtaining an up-link rain attenuation amount based on the actual rain attenuation amount ratio and the down-link rain attenuation amount by latching the rain attenuation amount ratio when said measurement executable judgement means determines that the measurement is impossible; and a selecting means, connected to said measurement executable judgement means and first and second mode arithmetic operation means, for selectively providing an output of said first mode arithmetic operation means when said measurement executable judgement means determines, based on the originating station returning wave, that measurement is possible and for selectively providing an output of said second-mode arithmetic means when said measurement executable judgement means determines that measurement is impossible, said outputs of said first and second mode arithmetic operation means forming a transmitting power control signal.

2. The transmitting power control system according to claim 1, wherein said first measurement means comprises a decoder for correcting an error of a digital demodulation signal, including a bit error, obtained from a demodulator demodulating the originating station returning wave and providing a demodulated signal to a receiver as a main signal, a coder for coding said main signal, an exclusive OR gate for detecting and outputting a coincidence between signals coded by the coder and the demodulated signal output from said demodulator and before coding, thereby providing an error bit, a bit error rate measurement means for measuring a bit error rate based on an output of said exclusive OR gate, and a total rain degradation amount calculating means for calculating the originating station returning wave total rain degradation amount by using an output of said bit error rate measurement means and a known ratio of a carrier wave to noise for clear weather.

3. The transmitting power control system according to claim 2, wherein said bit error rate measurement means comprises a first counter for counting an output pulse of said exclusive OR gate as an error pulse, a second counter for counting a total number of pulses during a period in which the bit error rate is measured, and a bit error rate arithmetic operating means for obtaining the bit error rate based on output from the first and second counters.

4. The transmitting power control system according to claim 3, wherein said bit error rate arithmetically operating means comprises a latch circuit for latching an output of the first counter when said second counter produces a carrier upon a completion of a time period for measuring the bit error rate, a parallel/serial conversion circuit for performing a parallel/serial conversion of an output of said latch circuit, a shift register for inputting an output of said parallel/serial converting circuit, an inverter for inverting a value of a most significant bit of said shift register, an AND circuit for inputting an output of the inverter and a clock signal and outputting a shift clock signal for said shift register, a down counter for performing a down count of a number of clocks until an output of said AND circuit becomes zero, and a converter for adding a bit number to an output of said down counter to shorten a required time period necessary for measurement of the bit error rate of the second counter, wherein the bit error rate is output in an exponential format by using an output of said converter as an exponential number when the output of the AND circuit becomes zero, content of said shift register as a fixed point part and 2 as a base.

5. The transmitting power control system according to claim 2, wherein said total rain degradation amount calculating means includes a memory for storing a relationship between a bit error rate output from said bit error rate measurement means and a current carrier wave/noise ratio and a subtractor for obtaining a ratio of a non-carrier wave/noise signal for clear weather to an output of the memory.

6. The transmitting power control system according to claim 1, wherein said second measurement means comprises a receiver for receiving said beacon wave, and a down-link rain attenuation amount calculating means for calculating a down-link rain degradation amount by using an output of said receiver.

7. The transmitting power control system according to claim 6, wherein said down-link rain degradation amount calculating means comprises a subtractor for subtracting a current carrier wave/noise ratio output from said receiver from a known down link beacon wave carrier wave/noise ratio for clear weather.

8. The transmitting power control system according to claim 1, wherein said first-mode arithmetic operating means comprises a first-mode up link rain degradation amount arithmetic operating means for arithmetically obtaining an up link rain degradation amount by using a returning rain degradation amount output from said first measurement means and a down link rain degradation amount output from said second measurement means and an up-link/down-link degradation amount ratio arithmetic operating means for arithmetically obtaining a ratio of an output from said first mode up link rain degradation amount arithmetically operating means to an output of the second measurement means.

9. The transmitting power control system according to claim 8, wherein said first mode up-link rain degradation amount arithmetic operating means includes:

beacon-wave/noise-carrier-wave ratio calculating means for calculating an inverse of a carrier wave/noise ratio from said beacon wave from a receiver, a first adder for adding a ratio of the inverse of carrier wave/noise ratio for a down-link for clear weather, the inverse of the carrier wave/noise ratio of the beacon wave for clear weather and an output of the beacon-wave/noise-carrier-wave ratio calculating means of the beacon wave, memory for storing an inverse of a sum of outputs of said first adder and the inverse of the carrier wave/ noise ratio for up link for clear weather in accordance with the output of said first adder, total noise/carrier wave ratio calculating means for calculating a total-noise/carrier-wave ratio for outputting an inverse of a total current carrier wave/noise ratio by using an output of said returning total rain degradation amount calculating means, a second adder for adding an output of the total noise/carrier wave ratio calculating means and the output from said memory, a third adder for adding an output of said second adder and incremented amount of a current transmitting power, thereby outputting the first-mode up-link rain degradation amount.

10. The transmitting power control system according to claim 8, wherein
said up link/down link degradation amount ratio arithmetically operation means obtains a ratio of said first-mode up-link rain degradation amount to the down-link rain degradation amount.

11. The transmitting power control system according to claim 8, wherein
said second mode arithmetic operation means comprises a latch circuit for latching an output of said up-link/down-link degradation amount ratio arithmetic operation means when said measurement executable judgement means based on the originating station returning wave that the measurement is impossible and a multiplier for multiplying an output of said second measurement means with an output of said latch circuit, thereby producing the second mode up-link rain degradation amount.

* * * * *